3,453,339
1-HALOALKYL SUBSTITUTED AROMATIC HYDROCARBONS AND PROCESS FOR THEIR PRODUCTION
Derek L. Ransley, Berkeley, Calif., assignor to Chevron Research Company, San Francisco, Calif., a corporation of Delaware
No Drawing. Filed May 11, 1967, Ser. No. 637,648
Int. Cl. C07c 25/14, 25/00, 3/56
U.S. Cl. 260—651                                  18 Claims

ABSTRACT OF THE DISCLOSURE

Dihalo-n-alkanes are used to alkylate aromatic hydrocarbons in a highly selective reaction to yield useful 1-haloalkyl substituted aromatic hydrocarbons. This result is achieved when the catalyst is HF–$BF_3$ and the halide is a primary-secondary n-dichloro-, n-dibromo, or mixed n-bromochloro-dihaloalkane.

---

This invention relates to novel 1-haloalkyl substituted aromatic hydrocarbons and to a unique process for their production. Primary alkyl chlorides and bromides are well known in the chemical art, especially as precursors for the production by halide group displacement of useful primary amines, sulfonates, alcohols etc. The aryl substituted primary chlorides and bromides of the present invention are desirable for the production of aryl substituted primary alkyl amines and alcohols, aryl substituted primary alkyl sulfonates and ethoxylates useful as biodegradable detergents, lube oil additives, and the like. The primary attachment of the foregoing functional groups provides relatively superior stability for these materials when used under severe conditions, for example, in the lubrication of internal combustion engines, in the production of temperature resistant compositions, etc.

The field of aromatic hydrocarbon alkylation has long been known and practiced. Surprisingly, there appears to be little or no art in this field relative to the present invention.

It has now been found that primary n-alkyl chlorides and bromides having a lower aryl hydrocarbon radical substituted for a hydrogen atom bonded to a remote secondary carbon atom of the alkyl group can be produced by the reaction of an alkylatable lower aromatic hydrocarbon with a normal primary-secondary-dihaloalkane having at least six and less than 51 carbon atoms and in which the secondary halide group is located at least three carbon atoms distant from the primary halide group. Either or both of the halides may be bromide or chloride. The reaction is carried out by maintaining in the liquid phase a mixture of the dihaloalkane, lower alkylatable aromatic hydrocarbon and a minor amount of added hydrogen fluoride, and boron trifluoride at a temperature in the range from about −20° to 50° C. Sufficient pressure should be applied to the reaction mixture to maintain the required liquid phase. The reaction time is desirably of sufficient duration for an appreciable conversion of the dihaloalkane feed.

Surprisingly, the resulting alkylate is one in which the aryl radical of the principal product fraction is attached to the secondary alkyl carbon atom most remote from the primary halide group.

In a preferred embodiment of the invention, one mol of a suitable dichloroalkane, for example, 1,X - dichlorooctane (X indicates a molecular mixture in which the second chloride group attachment is mainly to remote secondary carbon atoms), and about five mols each of benzene and hydrogen fluoride are charged to an HF-resistant reaction vessel, e.g., a copper or polyethylene reactor. While maintaining the temperature of the reaction mixture in the range from about −5° to 20° C., preferably about 0° C., a stream of $BF_3$ sufficient to maintain a $BF_3$ saturated solution is introduced into the body of the liquid reaction mixture. The reactants are desirably stirred vigorously. About one minute after the reaction mixture has become saturated with $BF_3$, there is a measurable conversion of the 1,X-dichloride. After a 20–30 minute period the desired conversion is essentially complete. All of the 1,X-dichloride is converted leaving essentially all of the 1,1-; 1,2- and α,ω-dichloroalkane unconverted.

The resulting reaction mixture is then separated into a hydrocarbon phase and a hydrogen fluoride phase. The separated hydrocarbon or alkylate phase is then washed with water, cold aqueous alkali, dried, and the 1-chloro-X-phenyloctane is recovered.

By an alkylatable lower aromatic hydrocarbon is meant by definition an aromatic hydrocarbon which: (1) contains less than 15 carbocyclic aromatic carbon atoms; (2) contains less than a total of 31 carbon atoms, and (3) contains at least one nuclear replaceable hydrogen atom bonded to the aromatic nucleus.

By an aryl radical is meant by definition an aromatic hydrocarbon from which a single nuclear bound hydrogen atom has been removed leaving a single unsatisfied valence bond.

By a remote secondary carbon atom is meant a carbon atom having at least one intermediate carbon atom between it and a primary carbon atom reference as in an alkyl chain.

Normal primary-secondary-dihaloalkanes (halogen selected from group having atomic number in the range 17 to 35, inclusive) containing at least six carbon atoms in the alkyl chain and in which the secondary halide is attached to a remote secondary carbon atom are suitable feeds for the instant process. For practical reasons straight chain dihaloalkanes containing more than about 50 carbon atoms are relatively undesirable process feeds for reasons of availability, limited solubility and the like. The preferred 1,X-dihaloalkane feeds are in the $C_6$–$C_{20}$ molecular weight range.

Among the contemplated feeds are single molecular weight species and mixed molecular weight ranges. In regard to the primary and secondary halogen substituents of these dihalo-feeds, both may be chloro, both may be bromo; or there may be one of each; either may be the primary or secondary substituent.

A particularly preferred class of dihaloalkane feeds is that obtained by the monohalogenation as by chlorination or bromination of a suitable straight chain primary alkyl chloride or bromide. These feeds contain a minor amount of 1,1-dihalo-, 1,2-dihalo- and α,ω-dihaloalkane impurities, and these impurities per se are not useful as feeds for the present process. However, under the process conditions they are not deleterious even when present in substantial portions, for example, 20–40 mol percent and higher. For this reason and as a corollary aspect of the instant invention, straight chain 1,1-, 1,2- and α,ω-dihaloalkanes (halogen as defined above) can be readily purified by using the instant process to selectively convert essentially all of the 1,X-dihaloalkane homologues (X≠1,2 or ω) to higher boiling 1-haloalkylbenzenes.

In general, suitable reaction temperatures are in the range from about −20 to 50° C. Preferably the reaction is called out in the range 0° C. to 20° C. At 0° the reaction rate is substantial and satisfactory. Above about 20° C. it is less convenient to carry out the process because a superatmospheric pressure sufficient to maintain hydrogen fluoride in the liquid reaction phase is required. At high reaction temperatures, i.e., in the range 30°–60° C. and higher, side reactions become a problem.

Suitable reaction periods vary depending upon temperature, relative amounts of hydrogen fluoride and boron trifluoride in the reaction mixture. A measurable conversion occurs in general in a matter of minutes. At 0° C. after about 20–30 minutes of reaction time, the use of preferred ratios of reactants results, in general, in a quantitative conversion. At −10° C. these require about one hour for a similar result. The usual time-temperature relationship holds herein. By and large, satisfactory and practical reaction periods are in the range .01 to 10 hours.

The amounts of reactants which may be present in the reaction mixture vary. Relative to the dihaloalkane feed, at least about a stoichiometric amount of the alkylatable aromatic hydrocarbon should be used. Preferably about a fourfold excess is added. Larger relative amounts are also satisfactory, except that with an increasing excess, the relative efficiency of the process suffers. Practical ratios of aromatic hydrocarbon to haloalkane are in general in the range from about 0.5–100 to 1, respectively.

The amounts of hydrogen fluoride and boron trifluoride relative to the dihaloalkane feed which may be present in the reaction mixture also vary over a range. Trace amounts, at least about an .01 to 1 mol ratio, for example, are effective and sufficient to yield a measurable amount of product in a reasonable period of time. Useful reaction rates are in general experienced when the mols of hydrogen fluoride per mol of aromatic hydrocarbon in the mixture are comparable, e.g., in the range 1–100 per mol of dihaloalkane. Usually a smaller relative amount of boron trifluoride is satisfactory. In a closed system the addition of 5 to 10 mol percent of the trifluoride based upon dihaloalkane is ordinarily sufficient. On the other hand, where boron trifluoride gas is passed into the reaction medium to maintain the saturation concentration of the boron trifluoride, there will be a smaller effective relative amount of this catalyst component dissolved in the mixture. Recycle of effluent boron trifluoride to the reaction mixture is then a desirable matter of economy and efficiency. Still another satisfactory means of adding the boron trifluoride catalyst component to the reaction mixture is in the form of the etherate or solution thereof in an organic ether. The presence of amounts of boron trifluoride in the reaction medium in excess of practical requirements, e.g., from about 0.1–2 mols per mol of dihaloalkane feed, is not deleterious to the process; it is merely inefficient.

In general the process is effected in the absence of inert diluents. At times, however, as in the case of naphthalene and other contemplated aromatic hydrocarbons having relatively high melting points, inert diluents are useful for solubilizing purposes. Cycloalkanes, primary alkyl chlorides, isooctane, pentane, alkanes in general, carbon disulfide and the like are suitable inert diluents.

Representative normal dihaloalkanes contemplated for use in the instant process are 1,5-dichlorohexane, 1,4-dichlorohexane, 1-bromo-5-chlorohexane, 1,4- and 1,5-dibromoheptane, 1-bromo-10-chloroeicosane, 1-bromo-7-chloroheptadecane, 1,10-dichlorododecane, 1,7-dichlorooctane, 1,3-dichlorononane, 1,6-dibromopentadecane, 1,12-dibromononadecane, 1-bromo-5-chloroundecane, 1-bromo-4-chloro-dodecane, 1-chloro-5-bromopentadecane, 1-bromo-4-chloro-undecane, 1,4-dibromoundecane, 1,6-dichloro-undecane, 1-chloro-7-bromo-undecane, 1,6-dibromo-tetradecane, 1-bromo-7-chloro-tetradecane, 1-bromo-10-chloro-nonadecane, 1,12-dibromo-nonadecane, 1-chloro-8-bromo-eicosane, 1-bromo-8-chloro-heneicosane, 1-bromo-13-chloro-docosane, 1,5-dichloro-tricosane, 1,8-dibromo-pentacosane, 1-bromo-10-chloro-triacontane, 1,4-dibromo-tetracontane, 1,4-dichloro-pentacontane, e.g. straight chain substituted alkanes of the formula 1-bromo- or -chloro-X-bromo-or-chloro-$C_nH_{2n}$, wherein $n=6$–$50$, inclusive, and X=a whole number in the range 3 to $(2n-1)$, inclusive, and mixtures thereof.

Representative contemplated alkylatable aromatic hydrocarbons contemplated for use in the process are benzene, naphthalene, biphenyl anthracene, phenanthrene, fluorene, acenaphthene, bibenzyl, toluene, α-methylnaphthalene, 2-methyl-biphenyl, tetralin, indane; o-, m-, and p-xylene and mixtures thereof; cumene, isodurene, α-isopropylnaphthalene, 1-phenyl-tetracosane, 1-(α-naphthyl)-eicosane, 1,2,3,4-tetrahydronaphthalene, β-methylnaphthalene, ethylbenzene, n-propylbenzene, t-butylbenzene, pseudocumene, sec-butylbenzene, p-cymene, m-diethylbenzene, t-amylbenzene, prehnitene n-amylbenzene and the like hydrocarbons. Benzene and substituted benzene hydrocarbons are preferred for practical reasons, and of these, benzene and alkylatable mono- and polymethylbenzene hydrocarbons are in general the most useful feeds, and are preferred. Benzene, toluene, xylene and mixtures thereof may be used. Aromatic hydrocarbon feeds having particularly high melting points, i.e., above about 100° C., are conveniently alkylated in a suitable inert solvent, in a co-reactant system, or in a coreactant system plus an inert diluent. For example, sufficient of a second alkylatable aromatic hydrocarbon, for example benzene, may be added to solubilize the high melting aromatic and a corresponding product mixture is produced, and the like.

The following examples will serve to further illustrate the invention.

EXAMPLE 1

A 1,X-dichlorooctane mixture was obtained by the chlorination of 1-chlorooctane. Into a 1-liter turbomixer, fitted with a gas inlet at the bottom and with a water-cooled condenser, was placed 561 g. (3.77 mols) of 1-chlorooctane. Nitrogen was passed through the solution for 15 minutes, and then chlorine was passed into the chloroalkane at approximately 443 ml./min. for 36 minutes. The reaction was catalyzed by irradiation of the mixture with a sunlamp. After flushing with nitrogen for 30 minutes, the product mixture was washed with water, 10 percent sodium bicarbonate, water and dried over magnesium sulfate. It was then distilled through a 9-inch by 1-inch column packed with glass helices; the portion boiling 112–119° C. (15 mm.) was essentially dichlorooctane (1,X-dichlorooctane).

The 1,X-dichlorooctane was analyzed by gas liquid phase chromatography using appropriate standards and found to be constituted as follows: (1,1- through 1,8-dichlorooctane, respectively) 2.0, 5.7, 12.2, 16.9, 17.8, 18.6, 20.6 and 4.9 percent. About one percent of n-octyl chloride was also present.

EXAMPLE 2

Benzene was alkylated using a sample of the 1,X-dichlorooctane produced in Example 1. The reaction was carried out at about 0° C. in a 1-liter polyethylene reactor fitted with a mechanical stirrer, a gas inlet tube and a copper reflux condenser. The reaction conditions, charge and other variables, as well as the results obtained, are listed in the following Table I. Product work-up procedures were those conventional to hydrogen fluoride catalyzed alkylations. Analyses were accomplished in the manner described above:

1-haloalkane containing a remotely bonded aromatyl group. The data demonstrate that all of the remote sec- TABLE I.—PRODUCTS AND CONVERSIONS OF 1,X-DICHLOROOCTANE IN ITS REACTION WITH BENZENE AND HF/BF

| Run (see below) | A | B | C | D | E | F | G | H | I | J | K | L |
|---|---|---|---|---|---|---|---|---|---|---|---|
| Overall dichloride conversion, percent | <1.0 | 2.8 | 6.4 | 8.3 | 65.8 | 69.6 | 74.7 | 76.6 | 77.3 | 79.0 | 80.8 | 86.7 |
| Dichloride conversion, percent: | | | | | | | | | | | | |
| 1,1-dichloride | | | | | | | | | | | | |
| 1,2-dichloride | | | | | | | | | | | | |
| 1,3-dichloride | | | | | | | | | | | | 9.0 |
| 1,4-dichloride | | | Trace | Trace | 8.8 | 11.0 | 19.9 | 24.0 | 33.2 | 39.8 | 42.2 | 90.3 |
| 1,5-dichloride | | | 6.5 | 8.2 | 64.3 | 70.4 | 87.5 | 96.2 | 98.5 | 100 | 100 | 100 |
| 1,6-dichloride | Trace | | 10.0 | 14.0 | 92.0 | 95.0 | 99.4 | 100 | 100 | 100 | 100 | 100 |
| 1,7-dichloride | Trace | | 9.3 | 18.4 | 98.0 | 99.0 | 99.4 | 100 | 100 | 100 | 100 | 100 |
| 1,8-dichloride | | | | | 98.5 | 99.9 | 100 | 100 | 100 | 100 | 100 | 100 |
| Product distribution, percent: | | | | | | | | | | | | |
| 1-chloro-4-phenyl | 4.5 | 4.8 | 3.2 | 3.5 | 4.4 | 4.0 | 4.5 | 4.6 | 3.9 | 4.6 | 4.1 | 4.2 |
| 1-chloro-5-phenyl | 12.3 | 14.3 | 16.1 | 12.5 | 12.7 | 13.3 | 14.0 | 13.9 | 13.2 | 15.5 | 13.9 | 14.1 |
| 1-chloro-6-phenyl | 33.6 | 28.6 | 29.0 | 31.3 | 30.9 | 31.2 | 28.8 | 27.8 | 29.4 | 30.8 | 31.0 | 29.6 |
| 1-chloro-7-phenyl | 49.5 | 52.4 | 51.6 | 51.4 | 52.0 | 51.4 | 53.0 | 53.7 | 50.3 | 49.0 | 51.0 | 52.1 |

A.—36.6 g. (0.2 mol) dichloride, 312 g. φH, 80 mls. HF, BF₃ at 4 ml./min. for 30 min.
B.—Dichloride (0.077 mol) φH 156 g., HF 40 ml., 5 drops BF₃ etherate.
C.—Same as B except 5 ml. BF₃ etherate.
D.—Same as A for 45 min.
E.—Same as B except BF₃ at 60 ml./min. for 2 min.
F.—Same as A for 60 min.
G.—Same as B except BF₃ at 143 ml./min. for 30 secs.
H.—Same as B except BF₃ at 143 ml./min. for 5 mins.
I.—Same as B except BF₃ at 143 ml./min. for 3 mins.
J.—Same as B except BF₃ at 143 ml./min. for 30 mins.
K.—Same as A for 90 mins.
L.—Same as A for 210 mins.

EXAMPLE 3

As in Example 2, the 1,X-dichlorooctane produced as in Example 1 was used to alkylate benzene except that the charge was as follows:

Charge:
1,X-dichlorooctane (0.2 mol) _____ g__ 36.8
Benzene (3.6 mols) _____ g__ 278
Hydrogen fluoride (~2.0 mols) _____ ml__ 40
BF₃ flow rate (ca. 22° C. and 1 atm.) _____ ml./min.__ 4

Aliquots were withdrawn at the times indicated, and analyzed to yield the results also listed below in Table II.

ondary halide groups, i.e., 1,3- to 1,7-dichlorooctane, inclusive, are selectively converted to product, whereas little or none of the other isomeric dichlorides are reacted.

EXAMPLE 4

This run was made in accordance with the conditions of Example 3, except that only 0.1 mol of the dichloride was used and the total reaction time was 360 minutes. At this time about 94 percent of the 1,3-dichloride had reacted, whereas none of the 1,1-, 1,2- and 1,8-dichlorooctane had been converted to chloroalkylbenzene. The product distribution was essentially analogous to that listed above for Example 3.

TABLE II

| Time (mins.) | 30 | 35 | 40 | 45 | 50 | 55 | 60 | 90 | 140 | 190 | 230 | 290 |
|---|---|---|---|---|---|---|---|---|---|---|---|---|
| Overall dichloride conversion | 9.3 | 38.9 | 49.2 | 66.9 | 69.5 | 73.4 | 75.4 | 82.6 | 83.5 | 85.2 | 86.2 | 81.0 |
| Individual dichloride conversion: | | | | | | | | | | | | |
| 1,1- | 0 | 0 | 0 | 0 | 0 | 0 | 0 | 0 | 0 | 0 | 0 | 0 |
| 1,2- | 0 | 0 | 0 | 0 | 0 | 0 | 0 | 0 | 0 | 0 | 0 | 0 |
| 1,3- | 0 | 0 | 4.0 | 6.3 | 11.3 | 17.7 | 20.6 | 35.0 | 52.6 | 66.0 | 64.4 | 80.6 |
| 1,4- | 4.0 | 23.2 | 39.0 | 52.4 | 65.5 | 73.4 | 79.5 | 97.0 | 100 | 100 | 100 | 100 |
| 1,5- | 12.4 | 48.5 | 66.9 | 82.3 | 90.9 | 94 | 97 | 100 | 100 | 100 | 100 | 100 |
| 1,6- | 15.3 | 63.6 | 97 | 97 | 98.5 | 100 | 100 | 100 | 100 | 100 | 100 | 100 |
| 1,7- | 15.3 | 63.6 | 97 | 97 | 98.5 | 100 | 100 | 100 | 100 | 100 | 100 | 100 |
| 1,8- | 0 | 0 | 0 | 0 | 0 | 0 | 0 | 0 | 0 | 0 | 0 | 0 |
| Products: | | | | | | | | | | | | |
| 7-phenyl-1-chloro- | 53.6 | 53.5 | 53.4 | 47.0 | 55.4 | 54.5 | 54.4 | 55.4 | 52.9 | 50.5 | 49.4 | 53.2 |
| 6- | 30.4 | 30.6 | 31.0 | 32.1 | 26.8 | 29.7 | 31.4 | 28.4 | 28.5 | 30.5 | 29.9 | 29.1 |
| 5- | 12.9 | 12.1 | 12.7 | 13.9 | 13.8 | 12.4 | 11.8 | 12.8 | 14.3 | 16.6 | 15.6 | 13.9 |
| 4- | 3.1 | 3.6 | 2.9 | 3.5 | 3.9 | 3.5 | 3.1 | 3.4 | 4.3 | 4.2 | 5.3 | 3.8 |

The above product distribution is set out together with the feed composition in the following table:

| X | Feed, percent 1,X-dichlorooctane | Product, percent 1-chloro-X-phenyloctane |
|---|---|---|
| 1 | 2.0 | None |
| 2 | 5.7 | None |
| 3 | 12.2 | None |
| 4 | 16.9 | 4.2 |
| 5 | 17.8 | 14.1 |
| 6 | 18.6 | 29.6 |
| 7 | 20.6 | 52.1 |
| 8 | 4.9 | None |

The above comparison demonstrates surprising selectivity for the instant reaction system. In the product more than 80 percent of the phenyl attachment is at the 6 and 7 carbon atom, whereas only 39 percent of the chloride feed contained the secondary chloride in these positions. Hence, there is a concurrent isomerization under the reaction conditions leading to a unique product, i.e., a

EXAMPLE 5

As in the preceding examples, benzene was alkylated using boron trifluoride-hydrogen fluoride as the catalyst, except that 1,5-dichlorooctane was used as follows:

Charge:
1,5-dichlorooctane (0.067 mol) _____ g__ 12.2
Benzene (4 mols) _____ g__ 312
Hydrogen fluoride (~1.4 mols) _____ ml__ 27
Boron trifluoride gas (ca. 22° C., 1 atm.) _____ ml./min.__ 4

When the solution became saturated with the boron trifluoride, a rapid reaction ensued and the conversion was essentially complete within about 15 minutes. The product was a mixture of 7-, 6-, 5-, and 4-phenyl-1-chlorooctanes in the approximate mol ratio of 50:30:15:5, respectively.

EXAMPLE 6

In a manner essentially analogous to that employed in

Example 1, 1-bromooctane was chlorinated to about a 20 mol percent conversion. The 1-bromo-X-chlorooctane (10 mm. Hg pressure boiling range 144–154° C.) was separated by distillation. The composition of this fraction was found to be:

| X: | 1-boro-X-chlorooctane, percent |
|---|---|
| 1 | — |
| 2 | 0.4 |
| 3 | 3.4 |
| 4 | 14.7 |
| 5 | 23.6 |
| 6, 7 | 54.2 |
| 8 | 3.4 |

At 0° C. and under the conditions as described above, benzene was alkylated as follows:

Charge:
1-bromo-X-chlorooctane (0.1 mol) _____g__ 22.3
Benzene (4 mols) _____g__ 312
Hydrogen fluoride (2 mols) _____ml__ 40
$BF_3$ _____mls./min__ 4

After about 20 minutes the solution became saturated with boron trifluoride and the alkylation reaction started. At 60 minutes reaction time the conversion level was about 75 percent, and at 75 minutes the desired conversion was about 95 percent complete. The alkylate product was found to be 1-bromo-X-phenyloctane as follows:

| X: | Mol percent |
|---|---|
| 7 | 49.6 |
| 6 | 30.7 |
| 5 | 15.2 |
| 4 | 4.2 |

EXAMPLE 7

As in the preceding example, benzene was alkylated using 1,4-dibromooctane. The reaction was complete after about 60 minutes. The product was 7-, 5-, 6-, and 4-phenyl-1-bromooctane in the approximate ratio of 50:30:15:5, respectively.

EXAMPLE 8

In the manner of the previous example, m-xylene was alkylated with 1-bromo-X-chlorooctane. The dihaloalkane feed was a mixture of 1,1-, 1,2-, 1,3-, 1,4-, 1,5-, 1,6-, 1,7- and 1,8-dihaloalkane in the proportions 0.4, 2.0, 10.5, 20.0, 21.4, 43.3 (6 and 7), and 2.1, respectively. The conversion with time was as follows:

| Time, min.: | Percent converted |
|---|---|
| 0 | 0 |
| 30 | 5.5 |
| 60 | 14.5 |
| 120 | 40.7 |
| 180 | 60.8 |
| 240 | 70.8 |
| 300 | 75.0 |
| 360 | 79.0 |

The resulting alkylate which was recovered in excellent yield was predominantly (ca. 96% selectivity re the aryl 1-position) 1-bromo-7-(3,5-dimethylphenyl) octane established by infrared, nuclear magnetic resonance, and mass spectra analytical techniques. An appreciable fraction of the above octane product had the phenyl attachment at the 6-position of the haloalkane.

EXAMPLE 9

In the manner of the preceding example, naphthalene was alkylated with an aliquot of the same 1-bromo-X-chlorooctane feed. The charge consisted of 64 g. (0.5 mol) of naphthalene, 128 g. (1.7 mols of carbon disulfide, e.g., an inert diluent) and 80 mls. (4 mols) of hydrogen fluoride. Boron trifluoride gas was passed into the solution as before. The conversion with time was as follows:

| Time, min.: | Percent |
|---|---|
| 0 | 0 |
| 15 | 0 |
| 30 | 59 |
| 45 | 75 |
| 60 | 82 |

The alkylate product was recovered in excellent yield. Analysis by nuclear magnetic resonance demonstrated that it was essentially a monoalkyl substituted naphthalene, containing the —$CH_2Br$ functional group, i.e., primary bromoalkyl group. The vapor phase chromatographic analysis showed that this product was mainly two isomers.

EXAMPLE 10

In the manner of preceding Examples 1 and 3, dodecyl, tetradecyl and hexadecyl chlorides were monochlorinated and the resulting 1,X-dichloroalkanes used to alkylate benzene. No detectable conversion of 1,1-, 1,2- and α,ω-dihaloalkanes in the feeds occurred while the other homologues were essentially quantitatively converted to the corresponding 1-chloro-X-phenylalkanes. The unconverted 1,1-, 1,2-, etc. dichlorides were removed by distillation from the 1-chloro-X-phenylalkanes. The latter were then diluted with carbon disulfide and anhydrous aluminum chloride (10 percent by weight of the dihalide) was added to the reaction mixture. An excellent yield of 1,4-dialkyltetralin was recovered by distillation from the resulting product.

When aluminum chloride or other conventional alkylation catalysts were employed in the reaction of the subject 1,X-dihaloalkanes with a lower aromatic hydrocarbon, rather than the present $BF_3$—HF catalyst system, the product was an undesirable complex mixture of Tetralins, diphenyloctanes, etc. On the other hand, when the 1-chloro-X-phenylalkane product of the present invention, for example, the above 1-chloro-X-phenyloctane mixture is subsequently treated with aluminum chloride, as in Example 10 above, the product is mainly 1-methyl-4-propyl, 1,2,3,4-tetrahydronaphthalene. That is to say, the present process makes avilable to the art a new route for the production of 1,4-dialkyl substituted Tetralins. The latter are useful per se and as precursors for the production of the corresponding substituted naphthalenes, as by catalytic dehydrogenation and the like.

These data demonstrate that in the alkylation of alkylatable lower aromatic hydrocarbons with the 1,X-dihaloalkanes of the present invention under the conditions thereof, at least 75 percent of the resulting product contains the aromatyl group attached to an aklyl carbon atom which is at least five carbon atoms distant from the primary halide group.

As will be evident to those skilled in the art, various modifications on this process can be made or followed, in the light of the foregoing disclosure and discussion, without departing from the spirit or scope of the disclosure or from the scope of the following claims.

I claim:
1. The process for the production of a primary n-alkyl-halide having a lower aromatyl hydrocarbon radical substituted for a hydrogen atom bonded to a secondary carbon atom remote from the primary alkyl-halide-bearing carbon atom, which comprises reacting an aromatic hydrocarbon which: (1) contains less than 15 carbocyclic aromatic carbon atoms; (2) contains less that a total of 31 carbon atoms; and (3) contains at least one nuclear replaceable hydrogen atom bonded to the aromatic nucleus, with a haloalkane selected from the group consisting of normal $C_6$-$C_{50}$, inclusive, dihaloalkanes having a single primary halide group and a secondary halide group located at least three carbon atoms distant from said primary group and molecular mixtures thereof by maintaining a mixture of said reactants, hydrogen fluoride, and boron trifluoride at a temperature in the range from about −20° C. to 50° C. and at a pressure sufficient to maintain hydrogen fluoride in the liquid phase, wherein for each mol of said dihaloalkane there is present in said mixture from about 0.5 to 100 mols each of hydrogen fluoride, and said aromatic hydrocarbon, and at least about .01 mol of boron trifluoride; said dihaloalkane having halide groups selected from the group consisting of chloride and bromide, thereby producing the corresponding 1-halo-X-aromatylalkane, wherein X connotes attachment to a remote secondary carbon atom of said alkane.

2. The process in claim 1 wherein said reaction temperature is in the range from about −20 to 20° C.

3. The process as in claim 1, wherein said reaction temperature is in the range from about −20° to 20° C., said aromatic hydrocarbon contains 6 aromatic carbocyclic carbon atoms and said dihaloalkane contains from 6 to 20 carbon atoms, inclusive.

4. The process as in claim 3 wherein said reaction is carried out by introducing a gaseous stream of boron trifluoride into said liquid reaction mixture.

5. The process as in claim 3, wherein said dihaloalkane is a dichloroalkane.

6. The process as in claim 3, wherein said dihaloalkane is a mixed chloro-bromo-alkane.

7. The process as in claim 2 wherein said aromatic hydrocarbon is an alkylatable naphthalene and said dihaloalkane contains from 6 to 20 carbon atoms, inclusive.

8. The process for the production of a 1-halo-X-aromatylalkane, wherein X connotes attachment to a remote secondary carbon atom of said alkane, by the reaction of an aromatic hydrocarbon which: (1) contains less than 15 carbocyclic aromatic carbon atoms; (2) contains less that a total of 31 carbon atoms; and (3) contains at least one nuclear replaceable hydrogen atom bonded to the aromatic nucleus, with a haloalkane selected from the group consisting of normal $C_6$–$C_{50}$, inclusive, dihaloalkanes having a single primary halide group and a secondary halide group located at least 3 carbon atoms distant from said primary group and molecular mixtures thereof, said halides being chloride, bromide, or combinations thereof which comprises:

(a) monochlorinating or monobrominating an alkyl chloride or bromide selected from the group consisting of normal $C_6$–$C_{50}$ primary chlorides or bromides;

(b) reacting the resulting dihalide with a said aromatic hydrocarbon by maintaining a mixture of said reactants, hydrogen fluoride, and boron trifluoride at a temperature in the range from about −20° to 50° C. and at a pressure sufficient to maintain hydrogen fluoride in the liquid reaction phase, wherein for each mol of said dihaloalkane present in said mixture from about 0.5 to 100 mols each of hydrogen fluoride, boron trifluoride and said hydrocarbon are present;

thereby producing said 1-halo-X-aromatylalkane.

9. The process of claim 8, wherein said temperature is in the range from about −20° to 20° C.

10. The process for the purification of a dihaloalkane selected from the group consisting of straight chain $C_6$–$C_{50}$, inclusive, 1,1-, 1,2- and α,ω-dihaloalkanes which contain an appreciable amount of the corresponding $C_6$–$C_{50}$, inclusive, 1,3- to 1,49-dihaloalkane, inclusive, as an impurity, wherein said halide groups are selected from the group consisting of chloride or bromide; which comprises reacting said impurity with an aromatic hydrocarbon which: (1) contains less than 15 carbocyclic aromatic carbon atoms; (2) contains less that a total of 31 carbon atoms; and (3) contains at least one nuclear replaceable hydrogen atom bonded to the aromatic nucleus, by adding to said impure dihaloalkene for each mol of the impurity from about 1 to 100 mols of said hydrocarbon, from about 1 to 100 mols of hydrogen fluoride, and from about 0.1 to 2 mols of boron trifluoride, and maintaining the resulting mixture at a temperature in the range from about −20 to 50° C. and at a pressure sufficient to maintain said reaction mixture in the liquid phase, thereby converting substantially all of said impurity to a corresponding monohalo-$C_6$–$C_{50}$-alkyl substituted aromatic hydrocarbon, and separating said alkyl substituted aromatic hydrocarbon from the resulting mixture.

11. The process as in claim 10 wherein said dihaloalkane is an α,ω-dihaloalkane.

12. The process for the production of a primary n-alkyl-halide having a phenyl, a tolyl or a polymethyl-substituted-phenyl hydrocarbon radical substituted for a hydrogen atom bonded to a secondary carbon atom remote from the primary alkyl-halide-bearing carbon atom, which comprises reacting an alkylatable aromatic hydrocarbon selected from the group consisting of benzene, toluene and polymethyl-substituted benzenes with a haloalkane selected from the group consisting of normal $C_6$–$C_{50}$, inclusive, dihaloalkanes having a single primary halide group and a secondary halide group located at least three carbon atoms distant from said primary group and molecular mixtures thereof by maintaining a mixture of said reactants, hydrogen fluoride, and boron trifluoride at a temperature in the range from about −20° C. to 20° C. and at a pressure sufficient to maintain hydrogen fluoride in the liquid phase, wherein for each mol of said dihaloalkane there is present in said mixture from about 0.5 to 100 mols each of hydrogen fluoride, and said aromatic hydrocarbon, and at least about .01 mol of boron trifluoride; said dihaloalkane having halide groups selected from the group consisting of chloride and bromide, thereby producing the corresponding 1-halo-X-aromatylalkane, wherein X connotes attachment to a remote secondary carbon atom of said alkane.

13. The process of claim 12 wherein said dihaloalkane is of the $C_6$–$C_{20}$, inclusive, molecular weight range and molecular mixtures thereof.

14. The process of claim 13 wherein said alkylatable aromatic hydrocarbon is selected from the group consisting of benzene, toluene, xylene, and mixtures thereof.

15. The process of claim 14 wherein said aromatic hydrocarbon is benzene.

16. The process of claim 14 wherein said aromatic hydrocarbon is m-xylene.

17. The isomeric mixture obtained by the reaction of benzene with a haloalkane selected from the group consisting of normal $C_6$–$C_{20}$, inclusive, dihaloalkanes having a single primary halide group and a secondary halide group located at least three carbon atoms distant from said primary group and molecular mixtures thereof by maintaining a mixture of said reactants, hydrogen fluoride, and boron trifluoride at a temperature in the range from about −20° to 50° C. and at a pressure sufficient to maintain hydrogen fluoride in the liquid phase, wherein for each mol of said dihaloalkane there is present in said mixture from about 0.5 to 100 mols each of hydrogen fluoride, and benzene, and from about .01 to 2 mols of boron trifluoride; said dihaloalkane having halide groups selected from the group consisting of chloride and bromide, thereby producing the corresponding isomeric 1-halo-X-arylalkane mixture, wherein X for the principal fraction of the resulting isomeric mixture connotes attachment to the secondary alkyl carbon atom most remote from said primary halide, and for the remainder connotes attachment to a remote secondary carbon atom of said alkane.

18. The composition of claim 17, wherein said dihaloalkane is obtained by the monochlorination or monobromination of a $C_6$–$C_{20}$ primary n-alkylbromide or chloride.

References Cited

UNITED STATES PATENTS

| | | |
|---|---|---|
| 2,004,073 | 6/1935 | Hass et al. |
| 2,324,249 | 7/1943 | Vaughan et al. -- 260—660 XR |
| 2,355,850 | 8/1944 | Dreisbach. |
| 2,455,003 | 11/1948 | Frey _____ 260—683.4 |
| 2,571,901 | 10/1951 | Lawlor _____ 204—163 |
| 2,631,172 | 3/1953 | Schmerling. |
| 2,899,370 | 8/1959 | Rosenberg _____ 204—163 |
| 3,259,664 | 7/1966 | Ray et al. _____ 260—660 XR |

OTHER REFERENCES

Simons et al., Jour. Am. Chem. Soc., vol. 60, pp. 2952–2954, 1938.

Olah, Friedel-Crafts and Related Reactions, vol. I (1963), pp. 40–43, Interscience Publishers, New York.

Harmon et al., Jour. Am. Chem. Soc., vol. 54, pp. 2521–2523, 1932.

LEON ZITVER, *Primary Examiner.*

H. T. MARS, *Assistant Examiner.*

U.S. Cl. X.R.

252—33, 50, 52, 161, 352; 260—652

PO-1050
(5/69)

UNITED STATES PATENT OFFICE
CERTIFICATE OF CORRECTION

Patent No. 3,453,339          Dated July 1, 1969

Inventor(s) Derek L. Ransley

It is certified that error appears in the above-identified patent and that said Letters Patent are hereby corrected as shown below:

Col. 3, line 8, "called" should read --carried--

Table I, line 1, last word, "HF/BF" should read --$HF/BF_3$--

Col. 7, line 41, "7-, 5-, 6-," should read -- 7-, 6-, 5-, --

Col. 8, line 41, "Tetralins" should read --tetralins--

Col. 8, line 48, "Tetralins" should read --tetralins--

Claim 1, Col. 8, line 71, "that" should read --than--

Claim 8, Col. 9, line 39, "that" should read --than--

Claim 10, Col. 9, line 74, "that" should read --than--

SIGNED AND
SEALED
JUN 16 1970

(SEAL)
Attest:

Edward M. Fletcher, Jr.
Attesting Officer

WILLIAM E. SCHUYLER, J
Commissioner of Patent